United States Patent

[11] 3,588,005

[72] Inventor Scott C. Rethorst, Pasadena, Calif.
[21] Appl. No. 790,351
[22] Filed Jan. 10, 1969
[45] Patented June 28, 1971

[54] RIDGE SURFACE SYSTEM FOR MAINTAINING LAMINAR FLOW
5 Claims, 10 Drawing Figs.

[52] U.S. Cl. ............................................. 244/41
[51] Int. Cl. ............................................. B64c 23/00
[50] Field of Search.................................. 244/41, 40, 123, 124, 130

[56] References Cited
UNITED STATES PATENTS
2,967,030 1/1961 Whitcomb................ 244/41
3,129,908 4/1964 Harper.................... 244/41(X)
FOREIGN PATENTS
681,633 5/1930 France..................... 244/41

Primary Examiner—Milton Buchler
Assistant Examiner—Carl A. Rutledge
Attorney—Smyth, Rostan and Pavitt ABSTRACT: In many applications where fluid flows over a solid surface, or where a body moves through a fluid medium, laminar, rather than turbulent or separated, flow is desirable. Friction in the fluid boundary layer in combination with an adverse pressure graident can cause turbulence or separation even on a very smooth surface. An adverse pressure gradient exists on the aft portion of most bodies due to the deceleration of fluid which has been accelerated over a convex forward portion. The present invention creates paths of relatively favorable pressure gradient by providing a system of smooth ridges shaped and located such that they accelerate cross flow components as well as the flow in the free stream direction. The ridges sweep some of the outer flow into the boundary layer to energize the layer in an orderly fashion. The flow in the boundary layer is accelerated over the ridges because of boundary layer thinning and because the ridges have less curvature than the surface. Therefore, the ridges cause less decleration of the free stream components than the surface, creating paths for relative acceleration of flow up the ridges. In addition, the ridges may be shaped in lateral cross section to create a venturi between two ridges. If the ridges are extended beyond the trailing edge of the surface relatively favorable pressure gradients can be maintained to the surface trailing edge. The ridge system performs the function of energizing the boundary layer in the manner of vortex generators without introducing turbulence. The ridge system also performs the function of a boundary layer bleed system without mechanical complexity.

INVENTOR
SCOTT C. RETHORST

INVENTOR
SCOTT C. RETHORST

INVENTOR
SCOTT C. RETHORST

BACKGROUND OF THE INVENTION

Flow of a fluid along a surface usually begins in laminar form, which produces little friction drag. Eventually, the laminar flow makes a transition to turbulent flow, which produces much higher friction drag. The causes of this breakdown in laminarity may include (1) surface roughness, (2) exterior energy sources, and (3) an adverse pressure gradient. The first two causes may be minimized by smooth fabrication and a nonturbulent environment. The third is more difficult to overcome, since any shape producing suction lift or enclosing a volume will generate a reduced pressure on its convex forebody (a favorable pressure gradient), and this pressure, in returning to free stream conditions aft of the body, must undergo an increase (an adverse pressure gradient) over some portion of the body. The flow is accelerated over the convex forebody, producing the favorable, negative pressure gradient and decelerated over the aft portion of the body, producing the unfavorable, positive pressure gradient. This deceleration, combined with frictional loss of energy in the boundary layer, decreases the ability of the flow to remain laminar. In the absence of a favorable pressure gradient or an outside energy source, the laminar boundary layer will become disordered, i.e., turbulent.

The region of adverse pressure gradient may be minimized by providing a long forebody, i.e., a long region of slight convex curvature such that the pressure gradient is small and favorable over much of the body. The aft region of adverse pressure gradient is then shorter, although the gradient is more severe. This mechanism is the basis for the conventional laminar flow wing. The permissible severity of the aft, adverse pressure gradient, however, is limited by the necessity for avoiding flow separation, which produces very high drag.

Devices in current use to overcome the tendency for laminar to turbulent flow transition and/or for flow separation include vortex generators and suction producing devices. Vortex generators operate by transferring energy from the free stream into the frictionally decelerated (de-energized) boundary layer, thereby providing energy to aid the flow in overcoming the adverse pressure gradient. This energy, however, is disordered, i.e., it tends to promote turbulence while delaying separation. In addition, the vortex generators themselves create a drag energy loss, though helping to avoid the greater separation energy loss. Suction devices may be installed in the body surface to provide a favorable pressure gradient on the aft portion of the body by sucking a portion of the boundary layer into the body. The flow must then be exhausted to the free stream by some mechanism. These suction devices require power as well as extensive ducting and slotting of the body surface and therefore are quite complex.

The present invention, therefore, is designed to produce a region of relatively favorable pressure gradient on the portion of a body where the pressure gradient is normally adverse to aid in preventing laminar flow transition or separation. In addition, the invention will add ordered rather than disordered energy to the boundary layer, thus avoiding the problems of vortex generators, and will be an integral part of the body surface, rather than a complex mechanism such as the suction devices.

BRIEF SUMMARY OF THE PRESENT INVENTION

The present invention comprises a series of ridges or waves integral with a solid surface and oriented at some angle to or parallel to the free stream velocity vector. These ridges are designed to fair smoothly into the surface but to project above it so that the surface curvature producing an adverse pressure gradient will be less on the ridges than on the normal surface. The pressure gradient on the ridges may be adverse, relative to the favorable pressure gradient on the fore portion of the surface, but will be favorable relative to the adverse gradient on the aft portion of the normal surface.

The flow over a surface tends to accelerate in the direction of a favorable pressure gradient and thus the ridges provide channels of accelerated flow in the free stream flow direction to add energy to the boundary layer and maintain flow laminarity in a region of normally adverse pressure gradient. In addition, the ridges may be variable in cross section with to provide a venturi effect to accelerate the flow between ridges and aid in maintaining laminar flow. The ridges may project beyond the aft end of the surface so that the adverse portion of the ridge pressure gradient will occur aft of the surface.

By providing regions of relatively favorable pressure gradient in the free stream flow direction (or longitudinal direction) routes are provided for any crosswise (or lateral) flow components to follow in orderly fashion. Normally, when the longitudinal flow in a boundary layer is decelerated to such an extent that is can no longer negotiate an adverse pressure gradient, any crosswise flow components are translated into random vortices which contribute to turbulence and separation. In allowing a path for lateral acceleration of the flow the longitudinal ridges utilize lateral flow energy to maintain ordered (laminar) longitudinal flow.

BRIEF DESCRIPTION OF THE DRAWINGS

The foregoing and other readily apparent features of my present invention will be better understood by reference to the following more detailed specification and accompanying drawings in which.

DETAILED DESCRIPTION OF THE PREFERRED EMBODIMENT

In the following paragraphs like numbers refer to the same or similar items from figure to figure.

In order to overcome the tendency of laminar flow over a surface to separate or become turbulent the present invention utilizes a series of ridges in regions of adverse pressure gradient to create channels of relatively favorable pressure gradient. These channels energize the boundary layer by providing paths for utilization of cross flow components and for acceleration of the flow relative to the normal surface of the body.

Figure 1:
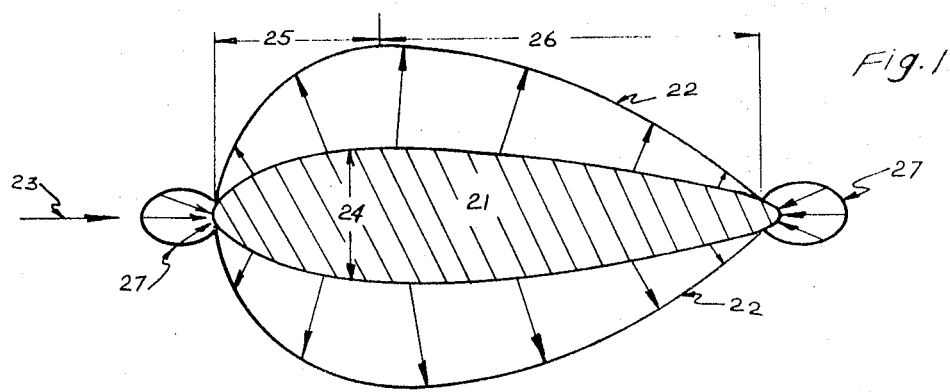
FIG. 1 is a cross sectional view of a general body of revolution showing a typical pressure distribution at zero angle of attack and at a zero lift condition.

On any body enclosing a volume such as is shown in FIG. 1 as an arbitrary body of revolution 21 at zero angle of attack, the flow is accelerated by the effect of the volume of fluid surrounding the body being reduced. In accordance with basic subsonic flow theory, if the cross sectional area available for a fluid to pass through is diminished, the velocity must increase This increase in velocity reduces the pressure acting on the surface of the body, creating areas of low pressure 22 indicated on FIG. 1 by arrows pointing outward. The pressure continues to decrease in the direction of flow 23 until the point of maximum body thickness 24 is reached. This region 25 is an area of favorable pressure gradient and aids in maintaining laminar flow. Aft of the maximum thickness point the pressure begins a return to its original value, i.e., that of the fluid at a large distance from the body. This region 26 is an area of unfavorable pressure gradient and is detrimental to flow laminarity. Regions of positive pressure 27 (pressure greater than atmospheric) exist at the nose of any body and may exist near the aft end if flow laminarity is not maintained.

Figure 2:
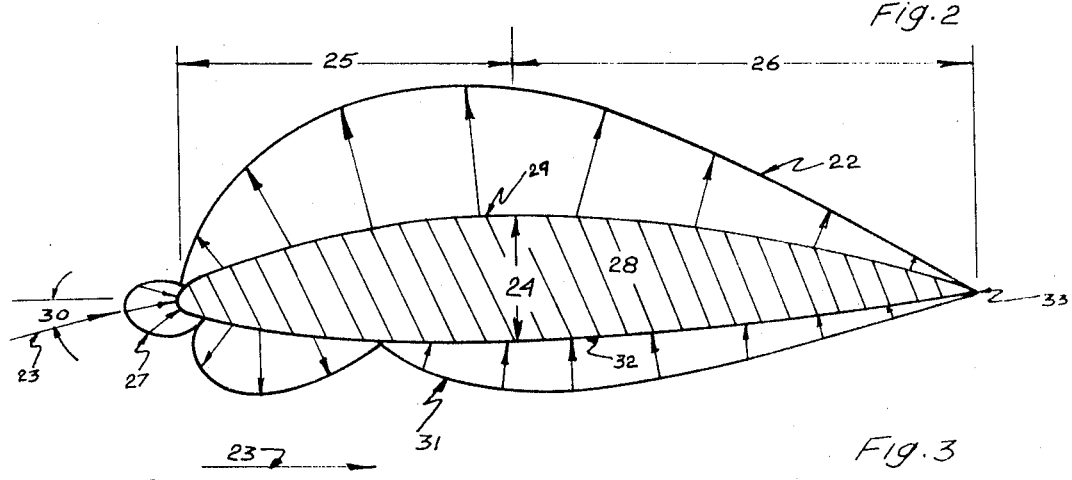
FIG. 2 is a cross sectional view of a typical laminar flow wing showing a possible pressure distribution at an arbitrary, unstalled angle of attack.

The laminar flow wing cross section 28 shown in FIG. 2 is designed to have the maximum thickness 24 fairly far aft so that the region of decreasing pressure 25 on the upper surface 29 will be more extensive than if the maximum thickness were farther forward. The section shown in FIG. 2 is depicted as being pitched at an angle of attack 30 relative to the free stream flow direction 23. This angle of attack could produce the positive pressure region 31 shown on the lower wing surface 32. The sharp trailing edge 33 of the wing aids in preventing flow separation which could lead to positive pressures on the aft portion of the wing, but an adverse pressure gradient 26 still exists on the upper surface aft of the maximum thickness point.

Figure 3:
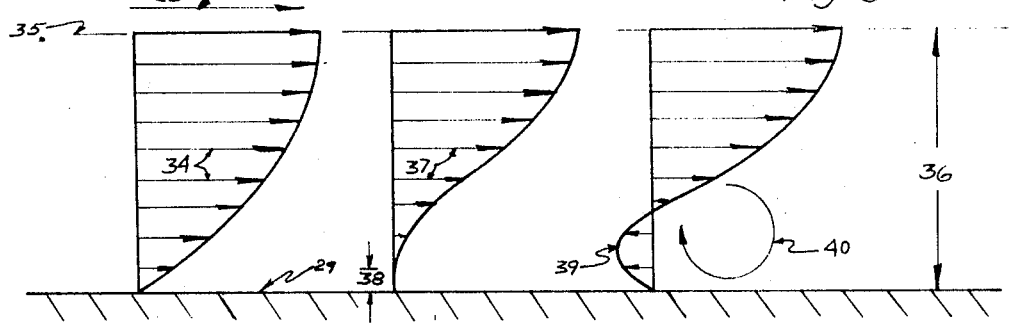
FIG. 3 is a schematic illustration of the velocity distribution in a decelerating boundary layer.

Velocity distribution in the boundary layer of the fluid next to a body surface is commonly depicted as being in layers of increasing velocity 34 as shown in FIG. 3. The velocity of the fluid in the layer immediately next to the surface 29 is at zero velocity with succeedingly higher layers 34 increasing in velocity as the fluid molecules slip over the layer below, until the upper region of the boundary layer 35 is reached. At this height 36, called the boundary layer thickness, the velocity is approximately the same as the free stream velocity 23. Because of the friction caused by the fluid molecules slipping in layers near the surface the velocity of the flow near the surface is progressively decreased in the direction of flow. This is shown in FIG. 3 as the arrows which indicate velocity of the layers 34 becoming shorter from left to right 37. When the velocity in several layers 38 near the wall becomes zero the flow can no longer remain laminar. Either the higher velocity upper layers will tend to curve down, creating small vortices, random flow motion and, consequently, turbulence (creating high friction drag), or the velocity near the wall will reverse 39, impelled by an adverse pressure gradient, and the flow will separate from the wall, creating large vortices 40 and high pressure drag. Therefore, in order to maintain laminar flow the energy lost in friction must be replaced by some mechanism.

Figure 4:
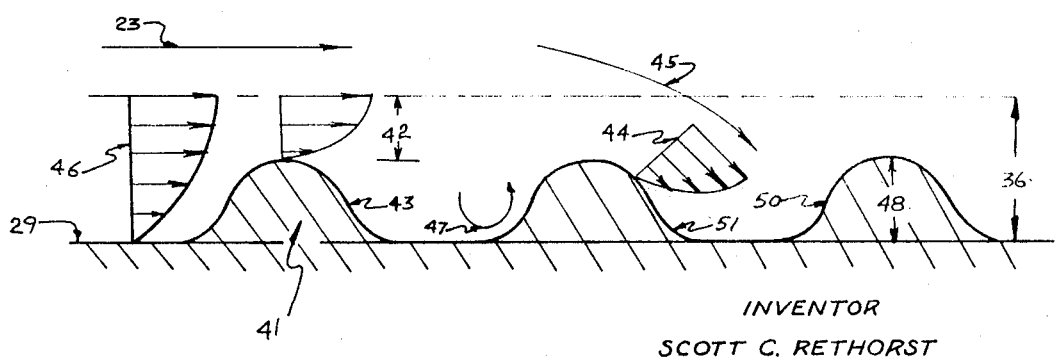
FIG. 4 illustrates a ridge system oriented normal to the free stream velocity vector, wherein the ridges are of a height smaller than the boundary layer thickness.

One method of adding energy to the flow near the wall is to provide smooth ridges 41 such as are shown in FIG. 4. These ridges are within the boundary layer so that the boundary layer thickness 36 is decreased 42 over the ridges 41, thereby accelerating the flow and maintaining laminarity. In proceeding down the back side 43 of the ridge the flow 44 tends to turn downward and some of the outer flow 23 is swept 45 into the boundary layer 46, adding energy and maintaining laminar flow. In addition, the "dead" or very low velocity fluid 47 next to the body surface tends to be left on the upwind side and the higher velocity layers shear onto the ridge surface, creating a thinner, higher velocity boundary layer. By these mechanisms the ridges aid in maintaining laminar flow in a direction normal to the ridges.

Figure 5:
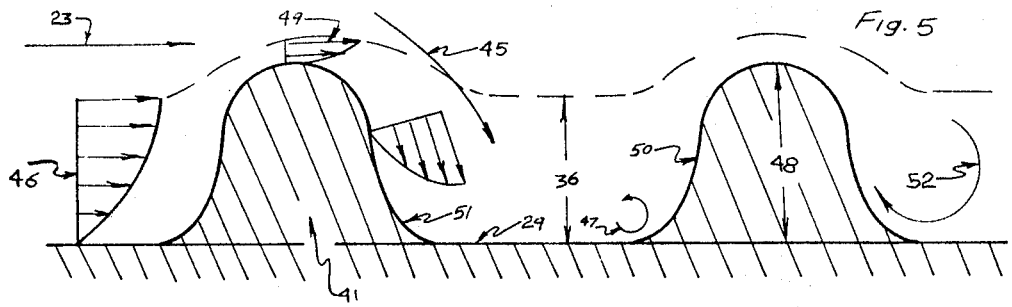
FIG. 5 illustrates a ridge system oriented normal to the free stream velocity vector, wherein the ridge height is greater than the boundary layer thickness.

In the case of ridges 41 which project slightly above the boundary layer, as shown in FIG. 5, fluid from the higher velocity 23 region outside the boundary layer will be swept into the boundary layer 46 of the normal surface 29. This normal surface boundary layer thickness 36 is less than the ridge height 48. The higher velocity fluid 45 will energize the boundary layer, while creating accelerated flow 49 over the ridges, helping to maintain laminar flow. As in the case of the ridge height 48 being less than the boundary layer thickness 36, the decelerated flow next to the surface will be left in "dead" areas 47 on the upwind side of the ridges. Low velocity vortices will be formed in these areas but should merely act to thicken the boundary layer on the upwind side 50 of a ridge, if the ridge is smoothly faired 51 into the normal surface.

The height 48 of the ridges is limited by the adverse pressure gradient on the downwind side. If this pressure gradient is severe enough separation or turbulence 52 will occur on the downwind side, disturbing the laminar flow. A favorable pressure gradient on the upwind side of the ridge and an unfavorable gradient on the downwind side are caused by the same mechanism that creates gradients on the convex surfaces of wings and bodies of revolution.

Figure 6:
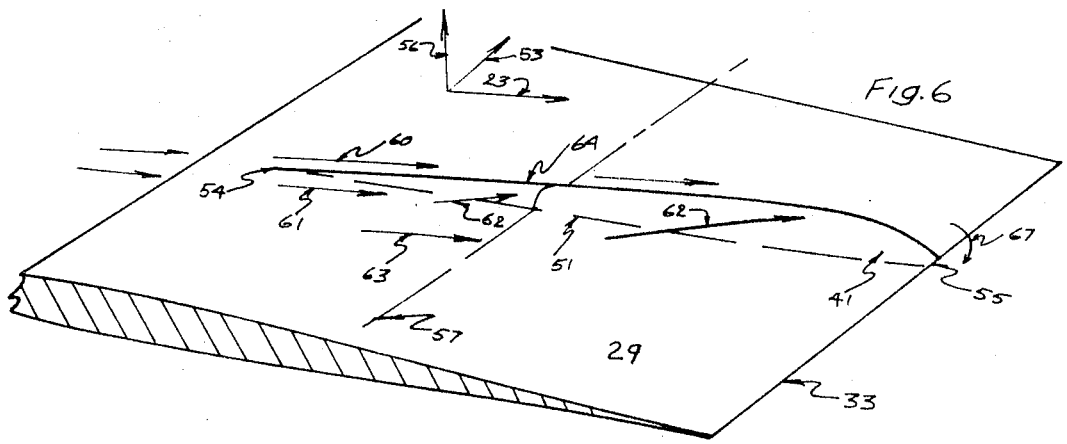
FIG. 6 is a three-dimensional view of a ridge oriented parallel to the free stream velocity vector, illustrating flow acceleration up the sides of the ridge.

If the ridges 41 shown in FIGS. 4 and 5 are turned so that they run parallel to the direction of flow as shown in FIG. 6, the components of flow in the cross wise direction 53 will act in the same manner to maintain flow laminarity as the free stream component 23 did when the ridges were normal to the free stream flow. Such cross flow components usually exist on both wings and bodies of revolution. Both ends 54 and 55 of the ridges are faired smoothly into the normal body surface 29 as well as being faired on the sides 51.

Laminarity of the flow is usually thought of as being determined by the ratio of inertia forces to viscous forces (known as Reynold's number). Above a certain value of this parameter (even for smooth surfaces) the flow will become turbulent or will separate. Reynold's number is commonly defined only in the direction parallel to the free stream flow 23. In addition, most simplifications of the Navier-Stokes equations (the basic descriptive fluid dynamics equations) neglect components which are not in the free stream direction. If ridges are introduced, however, the cross flow components 53 which normally exist on wings and bodies of revolution become important because of being accelerated by the ridges. Such acceleration of the cross or lateral flow components 53 takes place in both the lateral 53 and vertical 56 directions. For this reason, components of the flow which are commonly neglected may be utilized by smooth ridges to become important in maintaining laminar flow.

Figure 7:
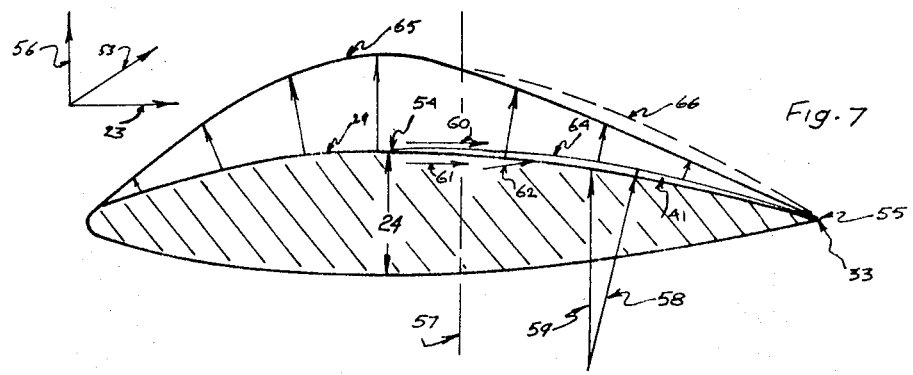
FIG. 7 is a cross sectional view of a ridge on a typical wing, illustrating the ridge fairing and curvature relative to the normal surface.

Ridges 41 oriented in the free stream direction 23 also make use of the free stream flow component 23 to maintain laminar flow. This mechanism is illustrated in FIGS. 6 and 7. At some point on a body surface 29 moving through a fluid, the flow will normally become turbulent. This point is represented by a dashed line 57. The ridge 41 is bugun 54 upstream of this line 57 and is faired into the surface 29 so that it continues the body curvature 58 with, however, less curvature than the normal surface 59. This difference in curvature results in the fluid 60 on top of the ridge being decelerated less than the fluid 61 on the body surface as indicated in the figures by the ridge velocity arrow 60 being longer than the surface velocity arrow 61. Because of this velocity differential the pressure on the upper surface of the ridge will be lower than that on the body surface. This pressure differential provides a path of flow 62 toward the ridge which is more favorable than the path 63 into the adverse pressure gradient on the body surface. Thus, the fluid near the ridge is accelerated toward the upper surface 64 of the ridge, adding energy to the boundary layer. This acceleration combines with the cross flow component energy to maintain the laminar flow behind the normal line of turbulence 57. The flow components 62 traveling up the side of a ridge meet those accelerating up from the other side of the ridge and both are swept along the top of the ridge in the free stream direction 23.

The difference in pressure distributions between the top of the ridge 64 and the body surface 29 is shown in FIG. 7. The body surface distribution 65 is shown as a solid line while the ridge distribution 66 is dashed. Behind the point of maximum thickness 24 the ridge pressure 66 can be seen to drop off more slowly than the surface pressure 65 (The pressures shown here are negative, as indicated by the outward arrows, and therefore a pressure "drop-off" is actually an increase, i.e., it is unfavorable.) Since the pressure gradient is the rate of change of pressure with distance in the free stream direction 23 a greater rate of pressure drop-off is unfavorable. At some distance down stream of the normal body surface turbulence line 57 the adverse pressure gradient over the ridge will be great enough to cause turbulence. However, flow laminarity will have been maintained over a larger portion of the surface than without the ridges.

As in the case of the ridges normal to the free stream direction, the height of the ridge will be determined by the necessity for avoiding flow separation 67. That is, the ridge must be faired smoothly 55 into the aft edge 33 of the surface 29 with a curvature less than that which will induce separation.

Figure 8:
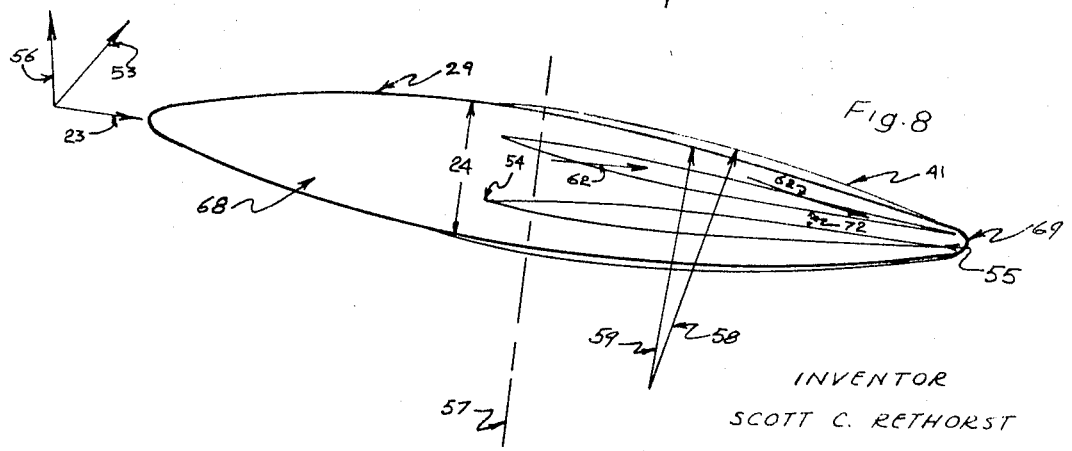
FIG. 8 is a three-dimensional view of a ridge system applied to a body of revolution.

A system of ridges could be utilized to maintain laminar flow on any body enclosing volume which moves through a fluid. The ridges may be oriented at any angle to the principal flow direction 23 or parallel to it. FIG. 8 shows a ridge system installed on a generalized body of revolution 68. The flow sweeps aft 23, is accelerated up the sides of the ridges 62, and maintains laminarity to some region aft of the normal turbulence line 57. The cross flow components 53 are accelerated over the ridges and may reduce the likelihood of separation near the aft end 69 of the body by allowing the flow to "corkscrew" smoothly off the aft end rather than encounter the abrupt adverse pressure gradient in the free stream direction caused by a blunted aft end.

Figure 9:
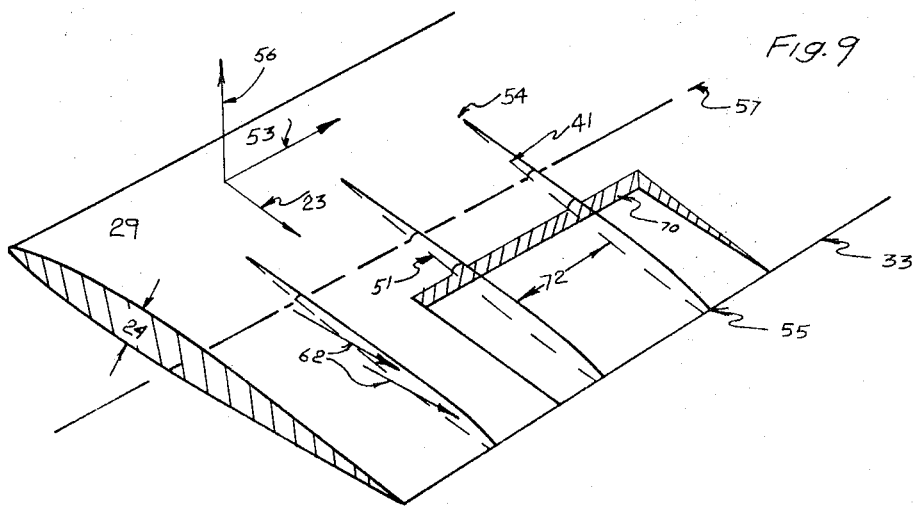
FIG. 9 is a three-dimensional view of a ridge system applied to the upper surface of a laminar flow wing.

A similar ridge system on a typical wing upper surface is shown in FIG. 9. Inboard spanwise flow components 53 are produced on the upper surfaces of finite wings because the pressure on the upper wing surface 29 is lower than the free stream pressure. These components are accelerated as they cross the ridges 41 and the free stream direction flow 23 accelerates 62 up the sides of the ridges to maintain laminar flow aft of the normal surface line of turbulence 57. Again, the ridges fair 54 into the surface 29 near the maximum thickness 24, on the edges 51, and at the trailing edge 55. The abruptness of the aft fairing 55 is determined by the necessity for the avoidance of separation. A cutaway view 70 of the ridge structure is also shown in FIG. 9.

Figure 10:
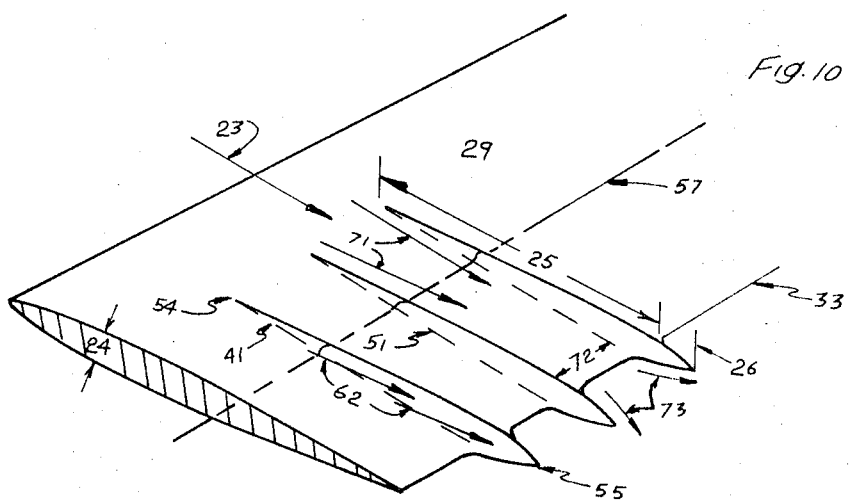
FIG. 10 is a three-dimensional view of ridges having a minimum point of distance between them and projecting aft of the trailing edge of the normal surface.

Another mechanism by which ridges could help maintain laminar flow over a surface 29 is illustrated in FIG. 10. In this case the flow is accelerated between 71 the ridges 41 as well as over 62 the ridges, i.e., a venturi effect is produced by shaping the ridges such that a minimum distance 72 between two ridges exists aft of the normal turbulence line 57. Thus, the flow between the ridges is accelerated up to the minimum distance point 72 because of the reduction in cross sectional area available for the flow in the boundary layer to pass through. If the ends of the ridges 55 were extended aft from the normal aft edge 33 of the surface 29 the deceleration 73 created by the distance between the ridges increasing, which results in an unfavorable pressure gradient 26, would occur aft of the surface 29. By this mechanism a relatively favorable pressure gradient 25 could be maintained over the entire surface. Thus, paths 71 for acceleration of the fluid would exist all the way to the aft end 33 of the normal surface 29. Even if the trailing ends 55 of the ridges 41 extend only to the trailing edge 33 of the normal surface 29, as shown in FIGS. 8 and 9, lateral shaping of the ridges will create a region of relatively favorable pressure gradient aft of the normal turbulence line 57.

Other utilizations of ridge systems could be made in ducts, channels, pipes, nozzles, or on any structure over which flow laminarity is desirable. The angle of the ridges to the flow would be determined by the individual application, as would size and exact shape of the ridges, their orientation to each other, their location on the surface, and the number of ridges to be used.

The ridge system described in the preceding paragraphs provides unique structure to utilize the principles of fluid mechanics by providing channels of relatively favorable pressure gradient in the region of normally unfavorable pressure gradient to maintain laminar flow in this region. By utilizing the flow in the higher velocity region of the boundary layer or in the stream external to the boundary layer to energize and accelerate the lower flow in the boundary layer, the ridge system performs the function of vortex generators without generating turbulence and performs the function of a suction system without the mechanical complexity of such a system.

It is clear from this disclosure and its accompanying set of figures that the means of maintaining laminar flow have been described in detail, and the magnitude of the provisions disclosed may be varied according to engineering considerations for different conditions as required.

What is claimed is:

1. A streamlined body having a smooth surface, said body having a maximum thickness between its leading and trailing origins defining a forebody and afterbody, and a plurality of ridges protruding from said surface to a height of the order of the boundary layer thickness, said ridges beginning essentially at the point of maximum thickness and extending in the streamwise direction along the afterbody to essentially the end of said body, said ridges having a radius of curvature greater than that of the afterbody surface itself to provide favorable pressure gradient routes within the adverse pressure gradient field in the afterbody region to maintain laminarity in fluid flow past said body.

2. A streamlined body having a smooth surface and a plurality of ridges protruding from said surface to a height of the order of the boundary layer thickness, said ridges extending in the streamwise direction and having a radius of curvature greater than that of the surface itself to provide favorable pressure gradient routes to maintain laminarity in fluid flow past said body.

3. A streamlined body having a smooth surface and a plurality of ridges protruding from said surface, to a height of the order of the boundary layer thickness, said ridges having a radius of curvature greater than that of the surface itself to extend into and impart higher energy flow into the boundary layer to maintain laminarity in fluid flow past said body.

4. A smooth surface and a plurality of ridges protruding from said surface to a height of the order of the boundary layer thickness, said ridges extending in the streamwise direction to provide favorable pressure gradient routes to maintain laminarity in fluid flow past said body.

5. A smooth surface and a plurality of ridges protruding from said surface to a height of the order of the boundary layer thickness, said ridges providing locally accelerated flow to maintain laminarity in fluid flow over said surface.